(12) United States Patent
Meng et al.

(10) Patent No.: US 12,500,310 B2
(45) Date of Patent: Dec. 16, 2025

(54) COVER ASSEMBLY, BATTERY CELL, BATTERY, ELECTRIC DEVICE, METHOD AND APPARATUS

(71) Applicant: CONTEMPORARY AMPEREX TECHNOLOGY (HONG KONG) LIMITED, Hong Kong (CN)

(72) Inventors: Wanqiu Meng, Ningde (CN); Qian Liu, Ningde (CN); Yonghuang Ye, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 17/842,114

(22) Filed: Jun. 16, 2022

(65) Prior Publication Data

US 2022/0311087 A1    Sep. 29, 2022

Related U.S. Application Data

(63) Continuation of application No. PCT/CN2020/124528, filed on Oct. 28, 2020.

(51) Int. Cl.
*H01M 50/375* (2021.01)
*H01M 50/15* (2021.01)
*H01M 50/342* (2021.01)

(52) U.S. Cl.
CPC ......... *H01M 50/375* (2021.01); *H01M 50/15* (2021.01); *H01M 50/342* (2021.01)

(58) Field of Classification Search
CPC .............. H01M 50/394; H01M 50/375
See application file for complete search history.

(56) References Cited

U.S. PATENT DOCUMENTS 4,567,118 A * 1/1986 Connelly ............ H01M 50/193
429/185
5,132,175 A * 7/1992 Mrotek ............ H01M 10/4207
429/89

(Continued)

FOREIGN PATENT DOCUMENTS

CN    203013810 U    6/2013
CN    106068157 A    11/2016

(Continued)

OTHER PUBLICATIONS

Choi, Kyung-Ju, and Joseph E. Spruiell. "Structure development in multistage stretching of PTFE films." Journal of Polymer Science Part B: Polymer Physics 48.21 (2010): 2248-2256. (Year: 2010).*

(Continued)

*Primary Examiner* — Allison Bourke
*Assistant Examiner* — Kayla Elaine Clary
(74) *Attorney, Agent, or Firm* — ANOVA LAW GROUP, PLLC (57) ABSTRACT

Embodiments of the application provide a cover assembly, a battery cell, a battery, an electric device, a method and an apparatus. The cover assembly includes a cover plate, a fixing member, a breathable film and a support, the cover plate being provided with a first through hole, the fixing member being used for being connected to the cover plate and provided with a second through hole, where the second through hole is configured to be in gas communication with the first through hole, the breathable film being connected to the fixing member and used for covering the second through hole, the second through hole being filled with the support, and the support being connected to the fixing member. According to the application, a release requirement of gas in the battery cell can be met, and meanwhile, safety performance of the battery cell can be improved.

15 Claims, 9 Drawing Sheets

(56) References Cited

U.S. PATENT DOCUMENTS

| | | | |
|---|---|---|---|
| 2002/0094473 A1* | 7/2002 | Lin | H01M 50/394 429/86 |
| 2015/0044530 A1* | 2/2015 | Koch | H01M 50/394 429/82 |
| 2017/0069890 A1* | 3/2017 | Ishii | H01M 50/394 |
| 2017/0269554 A1* | 9/2017 | Germiquet | G04B 37/08 |
| 2021/0193981 A1* | 6/2021 | Emery | H01M 50/317 |

FOREIGN PATENT DOCUMENTS

| | | |
|---|---|---|
| CN | 207504031 U | 6/2018 |
| CN | 208507798 U | 2/2019 |
| CN | 109817853 A | 5/2019 |
| CN | 110021728 A | 7/2019 |
| CN | 110391367 A | 10/2019 |
| CN | 110429214 A | 11/2019 |
| CN | 209880668 U | 12/2019 |
| EP | 3115100 A1 | 1/2017 |
| EP | 3115102 A1 | 1/2017 |
| JP | 2004165128 A | 6/2004 |
| JP | 2008198664 A | 8/2008 |
| JP | 2015170470 A | 9/2015 |
| JP | 2015181153 A | 10/2015 |
| JP | 2018050037 A | 3/2018 |
| KR | 1020160130418 A | 11/2016 |

OTHER PUBLICATIONS

Rai, Ashish, et al. "Importance of phase change of aluminum in oxidation of aluminum nanoparticles." The Journal of Physical Chemistry B 108.39 (2004): 14793-14795. (Year: 2004).*

Tsioptsias, Costas, et al. "Thermal behavior of poly (vinyl alcohol) in the form of physically crosslinked film." Polymers 15.8 (2023): 1843. (Year: 2023).*

Marlin Steel, What is the Melting Point of Stainless Steel? Retrieved from https://www.marlinwire.com/blog/what-is-the-melting-point-of-stainless-steel on Apr. 24, 2025. (Year: 2025).*

The World Intellectual Property Organization (WIPO) International Search Report for PCT/CN2020/124528 Aug. 2, 2021 6 pages (including translation).

The European Patent Office (EPO) Extended Search Report for EP Application No. 20959082.7 Jul. 26, 2023 26 Pages.

The Japan Patent Office (JPO) Notification of Reasons for Refusal for Application No. 2022-567104 Dec. 18, 2023 6 Pages(including translation).

China National Intellectual Property Administration (CNIPA) Office Action 1 for Application No. 202080102055.7 Jun. 15, 2024 11 Pages (including translation).

Korean Intellectual Property Office (KIPO) Office Action 1 for Application No. 10-2022-7038614 Oct. 18, 2024 15 Pages (including translation).

State Intellectual Property Office of China Notice of Grant of Invention Patent Right for Application No. 202080102055.7 Dec. 11, 2024 6 pages (including translation).

* cited by examiner

COVER ASSEMBLY, BATTERY CELL, BATTERY, ELECTRIC DEVICE, METHOD AND APPARATUS

CROSS REFERENCE TO RELATED APPLICATION

The application is a continuation of International Application No. PCT/CN2020/124528, filed on Oct. 28, 2020, which is incorporated in its entirety herein by reference.

TECHNICAL FIELD

The application relates to the technical field of batteries, in particular to a cover assembly, a battery cell, a battery, an electric device, a method and an apparatus.

BACKGROUND ART

With the advantages of high energy density, high power density, high recyclability, long storage time, etc., the rechargeable battery cell is widely used in electric vehicles. Since the exhaust safety of the battery cell restricts its development, the technical research related to the safety performance of the battery cell has been conducted.

SUMMARY OF THE INVENTION

Embodiments of the application provide a cover assembly, a battery cell, a battery, an electric device, a method and an apparatus. The cover assembly may meet a release requirement of gas in the battery cell, and also may improve safety performance of the battery cell.

In one aspect, an embodiment of the application provides a cover assembly of a battery cell. The cover assembly includes: a cover plate, a fixing member, a breathable film and a support, the cover plate being provided with a first through hole, the fixing member being used for being connected to the cover plate and provided with a second through hole, where the second through hole is configured to be in gas communication with the first through hole, the breathable film being connected to the fixing member and used for covering the second through hole, the support being placed in the second through hole, and the support being connected to the fixing member and used for supporting the breathable film and allowing gas to pass through the breathable film.

According to the cover assembly provided by the embodiment of the application, the cover assembly includes the cover plate, the fixing member, the breathable film and the support, where the second through hole is in gas communication with the first through hole, the breathable film has a breathable function, accordingly, gas generated by the battery cell may be discharged to an outside of the battery cell by means of the breathable film, and the gas is prevented from being accumulated in a casing, thereby improving performance of an electrode assembly and prolonging service life of the battery cell. By arranging the support, the breathable film may be supported, it may be improved that the breathable film is still kept intact under the condition of large internal pressure of the battery cell, damage to the breathable film may be avoided, breathable performance of the breathable film in the entire service life of the battery cell may be improved, and further the safety performance of the battery cell may be improved.

According to one aspect of an embodiment of the application, a melting point of the support is greater than that of the breathable film. When a temperature of the battery cell reaches the melting point of the breathable film, the breathable film deforms and flows, since the melting point of the support is greater than that of the breathable film, a material of the support does not reach the melting point thereof, a support framework effect may be achieved on the breathable film, and flowing and deformation of the breathable film are reduced.

According to one aspect of an embodiment of the application, a difference value between the melting point of the support and the melting point of the breathable film is greater than or equal to 10° C., so the support may be effectively prevented from deforming when the breathable film deforms and flows, thereby improving a support effect on the breathable film.

According to one aspect of an embodiment of the application, a shear strength at a joint between the support and the fixing member is greater than or equal to 0.3 MPa. When internal pressure of the battery cell is increased, shape stability of the support and stability of connection strength between the support and the fixing member may be improved, thereby improving the support effect on the breathable film, preventing the breathable film from deforming or even breaking, and improving the breathable effect of the breathable film.

According to one aspect of an embodiment of the application, the breathability of the support is greater than that of the breathable film. Since the breathable film is made of a material for controlling the entire breathable effect of the battery, gas passing through the breathable film needs to be smoothly discharged from the support to the outside of the battery cell. The breathability of the support is greater than that of the breathable film, so the gas, passing through the breathable film, in the battery cell may be smoothly discharged from the support, so as to improve the safety performance of the battery cell.

According to one aspect of an embodiment of the application, the fixing member is a metal ring provided with the second through hole, the support includes a hydrophobic breathable material, and the support is connected to the fixing member by means of a chemical bond or a metal bond. By means of the above arrangement, on the basis of meeting a support requirement for the breathable film, it may be improved that gas passing through the breathable film may smoothly pass through the support, so as to improve the breathable effect of the breathable film, water vapor, etc. may be blocked, so as to avoided the situation that the water vapor enters the battery cell to affect the battery cell, in addition, electrolyte in the battery cell may be prevented from being exposed, and the connection strength between the support and the fixing member may be improved.

According to one aspect of an embodiment of the application, a difference value between a maximum size of the breathable film and a maximum size of the support is greater than or equal to 8 mm in a radial direction of the first through hole, and an orthographic projection of a geometric center of the breathable film coincides with an orthographic projection of a geometric center of the support in an axial direction of the first through hole. A combination area between a periphery of the breathable film and the support may be improved, and composite strength and sealing performance between the breathable film and the support may be improved.

According to one aspect of an embodiment of the application, a diameter of the second through hole remains unchanged in a direction away from the breathable film.

According to one aspect of an embodiment of the application, a diameter of at least part, in a length direction, of the second through hole tends to be reduced in a direction away from the breathable film. When the cover assembly is used for the battery cell, one side of the breathable film faces a battery assembly and makes direct contact with the gas inside the battery cell. The diameter of at least part, in the length direction, of the second through hole tends to be reduced in the direction away from the breathable film, so when the breathable film deforms outwards in advance under the action of the internal gas pressure of the battery cell, a hole wall of the second through hole formed in an enclosing mode may provide certain support for the breathable film at a diameter reducing position, so as to avoid deformation of the breathable film, thereby improving the breathable effect and the safety performance of the breathable film.

According to one aspect of an embodiment of the application, the diameter of the second through hole is gradually reduced in the direction away from the breathable film.

According to one aspect of an embodiment of the application, the diameter of the second through hole is reduced section by section in the direction away from the breathable film.

According to one aspect of an embodiment of the application, the diameter of the second through hole is firstly reduced and then increased in the direction away from the breathable film.

According to one aspect of an embodiment of the application, the first through hole includes an accommodation section and an extension section extending from the accommodation section, a diameter of the accommodation section being greater than that of the extension section, and the fixing member and the support are at least partially accommodated in the accommodation section. Thus, space occupied by the fixing member is reduced, so as to reduce an overall height of the battery cell.

According to one aspect of an embodiment of the application, the accommodation section is provided with a bottom wall surrounding the extension section, the breathable film is at least partially sandwiched between the fixing member and the bottom wall to separate the second through hole from the extension section, and the support is arranged on one side, away from the extension section, of the breathable film. The accommodation section and the extension section with different diameter s form a step surface (that is, the bottom wall), and the step surface may support the fixing member, so the fixing member may be conveniently positioned when the fixing member and the cover plate are welded.

According to one aspect of an embodiment of the application, the fixing member is provided with a groove arranged around the second through hole, and the breathable film is at least partially accommodated in the groove. By arranging the groove, the space occupied by the breathable film may be reduced, and the overall thickness of the fixing member and the breathable film may be reduced.

In another aspect, an embodiment of the application provides a battery cell, including: a casing provided with an opening; an electrode assembly accommodated in the casing; and the above cover assembly, wherein the cover assembly is connected to the casing and covers the opening of the casing, a breathable film is positioned between the electrode assembly and a support.

The battery cell provided in the embodiment of the application includes the cover assembly provided in each embodiment, gas generated in the battery cell may be discharged to the outside of the battery cell by means of the breathable film, and the gas is prevented from being accumulated in the casing, thereby improving performance of the electrode assembly and prolonging the service life. By arranging the support in the cover assembly, the breathable film may be supported, improve the breathable film may still be kept intact under the condition of high internal pressure of the battery cell, damage to the breathable film may be avoided, breathable performance of the breathable film in the entire service life of the battery cell may be improved, and further better safety performance of the battery cell is achieve.

In yet another aspect, an embodiment of the application provides a battery, including the battery cell described above.

In yet another aspect, an embodiment of the application provides an electric device, including the battery described above, and the battery is used for providing electrical energy.

In yet another aspect, an embodiment of the application provides a method for manufacturing a battery cell, including:

providing a casing provided with an opening;

providing an electrode assembly, and arranging the electrode assembly in the casing; and providing a cover assembly, where the cover assembly includes a cover plate, a fixing member, a breathable film and a support, the cover plate being provided with a first through hole, the fixing member being used for being connected to the cover plate and provided with a second through hole, where the second through hole is configured to be in gas communication with the first through hole, the breathable film being connected to the fixing member and used for covering the second through hole, the support being placed in the second through hole, and the support being connected to the fixing member and used for supporting the breathable film; and the cover assembly is arranged at the opening to be connected to the casing by means of the cover plate, and gas in the casing passes through the breathable film and the fixing member.

In yet another aspect, an embodiment of the application provides an apparatus for manufacturing a battery cell, the apparatus including:

a first assembling device configured to provide a casing provided with an opening;

a second assembling device configured to provide an electrode assembly, where the electrode assembly is arranged in the casing; and a third assembling device configured to provide a cover assembly, where the cover assembly includes a cover plate, a fixing member, a breathable film and a support, the cover plate being provided with a first through hole, the fixing member being used for being connected to the cover plate and provided with a second through hole, where the second through hole is configured to be in gas communication with the first through hole, the breathable film being connected to the fixing member and used for covering the second through hole, the support being placed in the second through hole, and the support being connected to the fixing member and used for supporting the breathable film, and the cover assembly is arranged at the opening to be connected to the casing by means of the cover plate, and gas in the casing passes through the breathable film and the fixing member.

BRIEF DESCRIPTION OF THE DRAWINGS

In order to describe the technical solutions in the embodiments of the application more clearly, the accompanying drawings required for describing the embodiments are briefly described below. Obviously, the accompanying drawings in the following description show merely some embodiments of the present disclosure, and a person of ordinary skill in the art would also be able to derive other accompanying drawings from these accompanying drawings without creative efforts.

In the drawings, the components are not drawn to actual scale.

BRIEF DESCRIPTION OF THE NUMBERS

1—vehicle; 1*a*—motor; 1*b*—controller; 10—battery; 11—first shell; 12—second shell; 20—battery module; 30—battery cell; 31—casing; 32—electrode assembly; 33—cover assembly; 331—cover plate; 332—fixing member; 333—breathable film; 334—support; 335—electrode terminal; 336—rupture disc; 337—first through hole; 337*a*—accommodation section; 337*b*—extension section; 337*c*—bottom wall; 338—second through hole; 339—groove; 100—apparatus; 101—first assembling device; 102—second assembling device; and 103—third assembling device.

DETAILED DESCRIPTION OF EMBODIMENTS

The implementation of the application will be further described in detail with reference to the accompanying drawings and the embodiments. The following detailed description of the embodiments and the accompanying drawings serve to illustrate principles of the application as examples, but are not intended to limit the scope of the application, that is, the application is not limited to the described embodiments.

In the description of the application, the following is to be noted: unless otherwise specified, "plurality" means two or more; the terms "upper", "lower", "left", "right", "inner", "outer", etc. indicate azimuthal or positional relations only for ease of description of the application and for simplicity of description, and are not intended to indicate or imply that the referenced device or element must have a particular orientation and be constructed and operative in a particular orientation, and thus may not be construed as a limitation on the application. Moreover, the terms "first", "second", "third", etc. are merely for descriptions and may not be understood as indication or implication of relative importance. "Perpendicular" is not perpendicular in a strict sense, but within error allowance. "Parallel" is not parallel in a strict sense, but within error allowance.

Nouns of locality appearing in the following description are orientation shown in the drawings and are not intended to limit the specific structure of the application. In the description of the application, it is also noted that unless expressly specified otherwise, the terms "mount", "connect", "connected", etc. are to be construed broadly and, for example, may be fixedly connected, or detachably connected, or integrally connected, and may be direct connected or indirect connected via an intermediary medium. The specific meanings of the above terms in the application may be understood on a case-by-case basis for those with ordinary skills in the art.

The applicant has investigated and analyzed a cover assembly after it has been found that the cover assembly with a breathable film is prone to the problem of breakage of the breathable film during operation. The applicant discovers that as the breathable film used in the cover assembly is very thin and has the problems of low strength, easiness in deformation, etc., the number of nanopores or micropores in the breathable film is increased and the pore diameter is increased when the breathable film is stretched to generate plastic deformation, and then the breathability is increased. When the outward breathability amount of gas in the battery cell is increased, external excessive water vapor permeates into the battery cell, so risks are brought to the electrical performance (for example, service life, direct current resistance (DCR), etc.) and safety performance of the battery cell. Moreover, when the internal pressure of the battery cell is increased, the breathable film has risk of rupture, which may cause a series of failure conditions caused by liquid leakage of the battery cell.

Based on the above problems discovered by the applicant, the applicant has made improvements to the structure of the battery cell. An embodiment of the application is further described below.

For a better understanding of the application, embodiments of the application are described below in conjunction with FIGS. 1-15.

Figure 1:
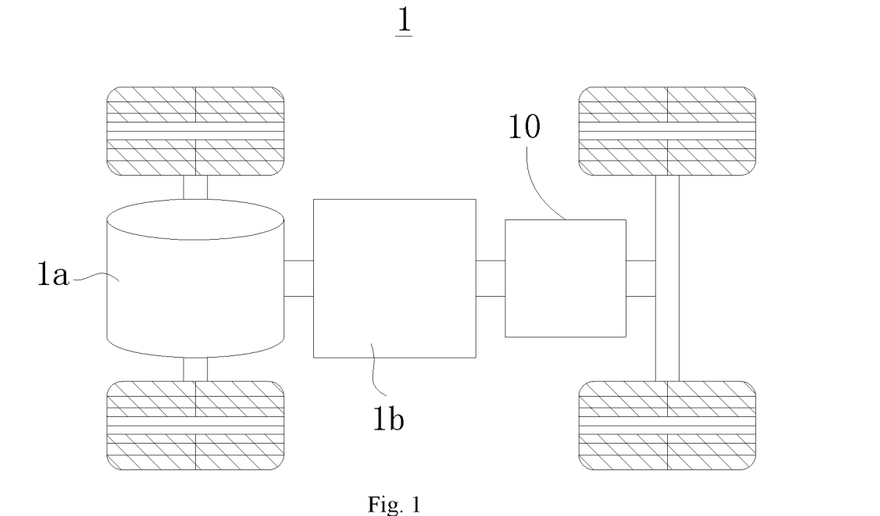
FIG. 1 is a structural schematic diagram of a vehicle in one embodiment of the application.

With reference to FIG. 1, this embodiment of the application provides an electric device using a battery 10 as a power supply. The electric device may be, but is not limited to, a vehicle, a ship, an aircraft, etc. One embodiment of the application provides a vehicle 1. The vehicle 1 may be a fuel, gas or new energy vehicle. The new energy vehicle may be a battery electric vehicle, a hybrid electric vehicle, an extended-range vehicle, etc. In one embodiment of the application, the vehicle 1 may include a motor 1*a*, a controller 1*b*, and the battery 10, where the controller 1*b* is used for controlling the battery 10 to supply power to the motor 1a; the motor 1a is connected to wheels by means of a transmission mechanism, thereby driving the vehicle 1 to travel; and the battery 10 may be used as a driving power source for the vehicle 1 to provide driving power for the vehicle 1 instead of or partially instead of fuel or natural gas. In one example, the battery 10 may be arranged at a bottom, head or tail of the vehicle 1. The battery 10 may be used to power the vehicle 1. In one example, the battery 10 may be used as an operational power source of the vehicle 1 for a circuit system of the vehicle 1. Illustratively, the battery 10 may be used for meeting work power demand at startup, navigation, and operation of the vehicle 1.

Figure 2:
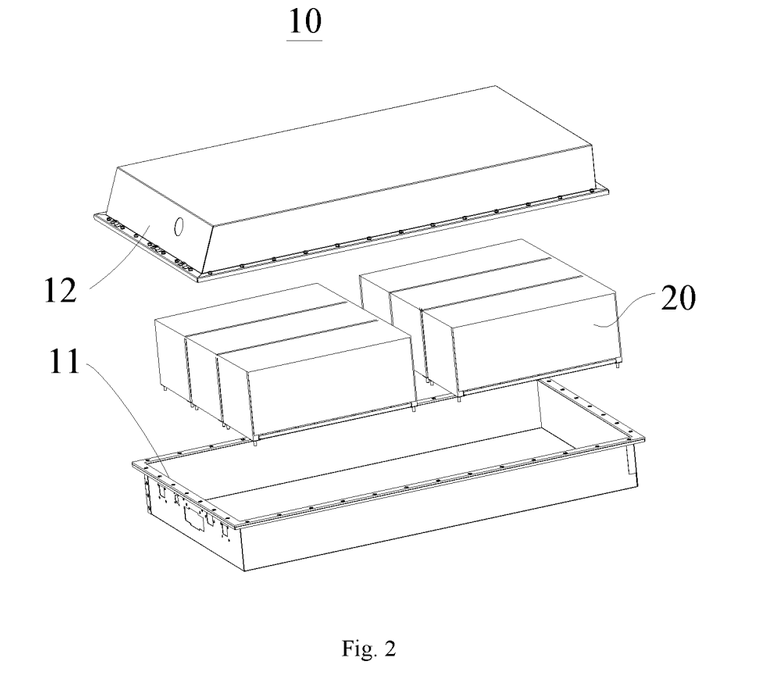
FIG. 2 is a schematic diagram of an exploded structure of a battery pack in one embodiment of the application.

With reference to FIG. 2, the battery 10 may include two or more battery modules 20. In some optional embodiments, the battery 10 further includes a box. The battery module 20 is arranged in the box. The two or more battery modules 20 are arranged in the box. The type of the box is not limited. The box may be a frame-like box, a disc-like box, a cabinet-like box, etc.

Illustratively, the box includes a first shell 11 for accommodating the battery module 20 and a second shell 12 covering the first shell 11. The first shell 11 covers the second shell 12 to define an accommodation portion for accommodating the battery module 20. In some embodiments, the battery 10 may also include one battery module 20. In other optional embodiments, the battery 10 includes a box and a plurality of battery cells arranged in the box directly.

Figure 3:
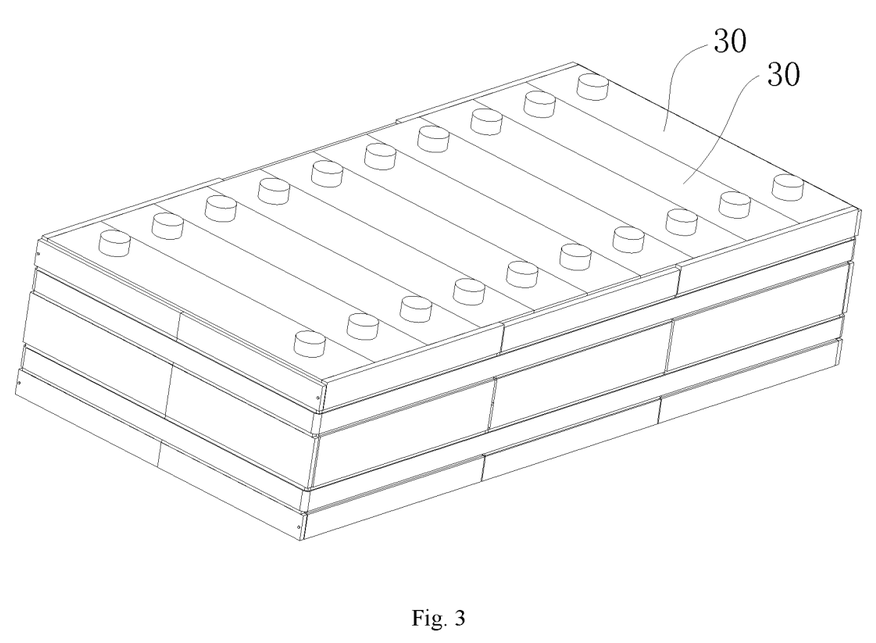
FIG. 3 is a schematic diagram of a partial structure of a battery module in one embodiment of the application.

With reference to FIG. 3, for meeting different power use requirements, the battery module 20 may include one or more battery cells 30. The plurality of battery cells 30 may be connected in series, in parallel or in a series-parallel mode to form a battery module 20, and then the plurality of battery modules 20 may be connected in series, in parallel or in a series-parallel mode to form a battery. A series-parallel mode refers to a mixture of series connection and parallel connection. Illustratively, the battery 10 may include the plurality of battery cells 30, where the plurality of battery cells 30 may be connected in series, in parallel or in series-parallel. The plurality of battery cells 30 may be arranged in the box directly. That is, the plurality of battery cells 30 may form the battery 10 directly, or may form the battery module 20 first, and then the battery module 20 forms the battery 10. The battery cell 30 includes, but is not limited to, a lithium ion battery cell, a lithium ion primary battery, a lithium-sulfur battery, a sodium lithium-ion battery, or a magnesium ion battery.

When the battery cell 30 of the embodiment of the application is used in the vehicle 1, a width of the battery cell 30 equals a height of the vehicle 1. The width of the battery cell 30 is also strictly limited by space limitation in a height direction of the vehicle 1, so when capacity of the battery cell 30 needs to be increased, the width of the battery cell 30 may not be infinitely increased, and a length of the battery cell 30 may be increased.

Figure 4:
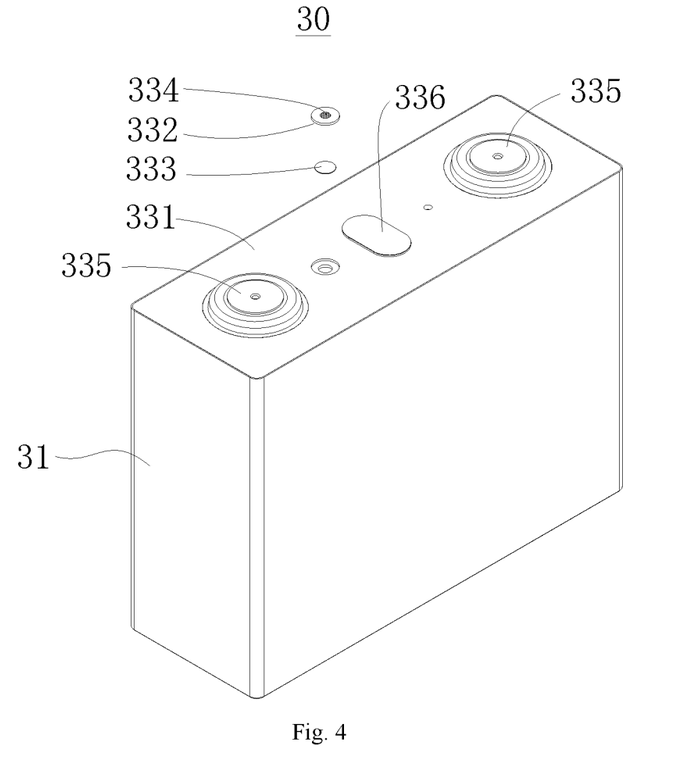
FIG. 4 is a structural schematic diagram of a battery cell in one embodiment of the application.
Figure 5:
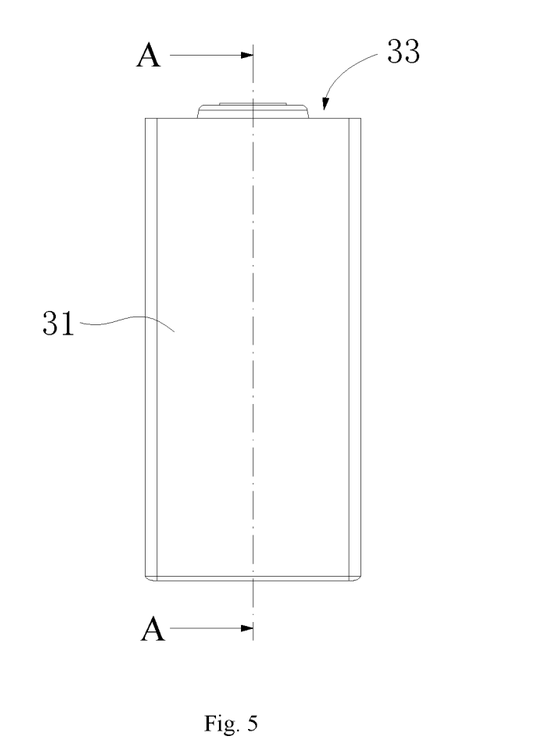
FIG. 5 is a side view of a battery cell in one embodiment of the application.
Figure 6:
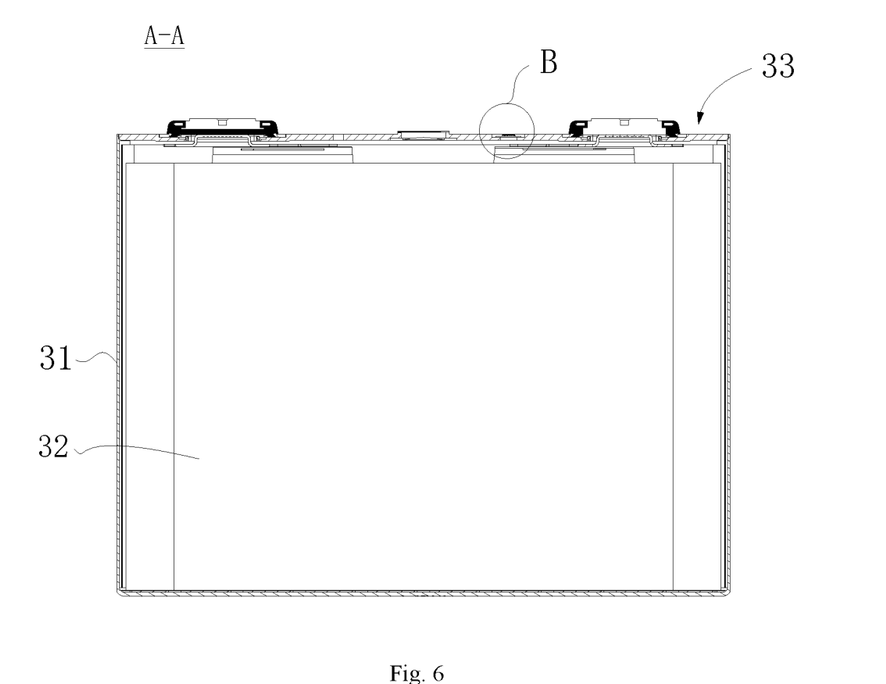
FIG. 6 is a cutaway diagram of FIG. 5 in direction A-A.

With reference to FIGS. 4-6, the battery cell in the embodiment of the application includes a casing 31 and an electrode assembly 32 arranged in the casing 31. The casing 31 of the embodiment of the application is of a square structure or other shapes. The casing 31 has an internal space accommodating the electrode assembly 32 and electrolyte, and an opening in communication with the internal space. The casing 31 may be made of aluminum, an aluminum alloy, plastic, etc. The electrode assembly 32 is a core member for the battery cell 30 to charge and discharge.

The electrode assembly of the embodiment of the application may be formed by stacking or winding a first pole piece, a second pole piece and a diaphragm between the first pole piece and the second pole piece together, and the diaphragm is an insulator between the first pole piece and the second pole piece. In this embodiment, illustratively, the first pole piece is a positive pole piece, and the second pole piece is a negative pole piece. Each of the positive pole piece and the negative pole piece includes a coated area and an uncoated area, the coated area of the positive pole piece is coated with a positive pole piece active substance, and the coated area of the negative pole piece is coated with a negative pole piece active substance. On the coated area, the active substance coats a current collector formed of thin metal foil, and no active substance coats the uncoated area. The electrode assembly 32 also includes two tabs, that is, a positive tab and a negative tab. The coated area of the positive pole piece and the coated area of the negative pole piece form a body portion. The uncoated area of the positive pole piece is staked to form the positive tab, and the uncoated area of the negative pole piece is stacked to form the negative tab. In some embodiments, the body portion is provided with two end faces oppositely arranged in a height direction, and the positive tab and the negative tab may extend from one end face of the body portion respectively.

The battery cell 30 of the embodiment of the application further includes a cover assembly 33. The cover assembly 33 is connected to the casing 31 and seals the opening of the casing 31. Illustratively, the cover assembly 33 and the casing 31 may be connected by means of welding.

With reference to FIGS. 4-9, the cover assembly 33 provided in the embodiment of the application includes a cover plate 331, a fixing member 332, a breathable film 333 and a support 334, where the cover plate 331 is provided with a first through hole 337. The fixing member 332 is used for being connected to the cover plate 331 and provided with a second through hole 338, where the second through hole 338 is configured to be in gas communication with the first through hole 337. The breathable film 333 is connected to the fixing member 332, where the breathable film 333 is used for covering the second through hole 338. The second through hole 338 is filled with the support 334, and the support 334 is connected to the fixing member 332 and used for supporting the breathable film 333 and allowing gas to pass through the breathable film 333.

Since gas (for example, CO, $CO_2$, $CH_4$, $C_2H_6$, $H_2$, etc.) is generated in a charging/discharging process of the electrode assembly 32, internal pressure in the casing 31 is continuously increased along with the accumulation of the gas, which is likely to cause the risk of battery deformation and deterioration of performance of the electrode assembly 32. In the battery cell 30 according to a first illustrative embodiment, the second through hole 338 is in gas communication with the first through hole 337, the breathable film 333 has a breathable function, accordingly, the generated gas may be discharged to an outside of the battery cell 30 by means of the first through hole 337, the breathable film 333 and the second through hole 338, and the gas is prevented from being accumulated in the casing 31, thereby improving performance of the electrode assembly 32 and prolonging service life of the battery cell 30.

By arranging the support 334, the breathable film 333 may be supported, it may be improved that the breathable film 333 is still kept intact under the condition of large internal pressure of the battery cell 30, damage to the breathable film 333 may be avoided, breathable performance of the breathable film 333 in the entire service life of the battery cell 30 may be improved, and further the safety performance of the battery cell 30 may be improved.

In some embodiments, the cover assembly 33 further includes an electrode terminal 335 arranged on the cover plate 331, the electrode terminal 335 extending outside the cover plate 331 and being electrically connected to the positive and negative pole pieces separately, and the electrode terminal 335 may be circular or square in shape, without limitation. Two or more battery cells 30 may be connected in series, in parallel, or in a series-parallel mode by means of the respective electrode terminals 335.

In some embodiments, the cover plate 331 is formed as a sheet metal, and provided with an injection hole for electrolyte to be injected and a sealing plug for sealing the injection hole. The cover plate 331 is further provided with a through terminal hole, and the electrode terminal 335 is arranged on one side of the cover plate 331 and covers the terminal hole. The electrode terminal 335 is formed in a cylindrical shape, and is fixed to the cover plate 331 by means of a connecting member surrounding an outer periphery thereof.

In some embodiments, the cover assembly 33 further includes a rupture disc 336 configured to rupture when the internal pressure of the casing 31 reaches a set value.

In some embodiments, the cover plate 331 is provided with a through discharge hole, and the rupture disc 336 is fixed to the cover plate 331 and covers the discharge hole. The rupture disc 336 is provided with a weak area, when the electrode assembly 32 generates a large amount of gas due to overcharging, short circuits, etc., gas pressure in the battery cell 30 is increased and breaks through the rupture disc 336 in the weak area, and the gas is discharged to the outside of the battery cell 30 by means the discharge hole, thereby reducing the risk of explosion of the battery cell 30.

Figure 7:
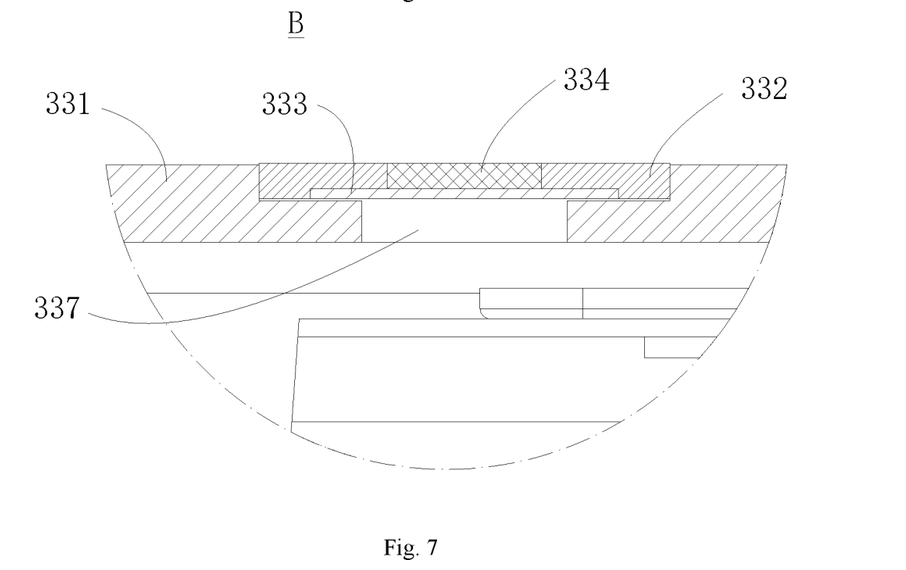
FIG. 7 is a partially enlarged diagram of portion B in FIG. 6.
Figure 8:
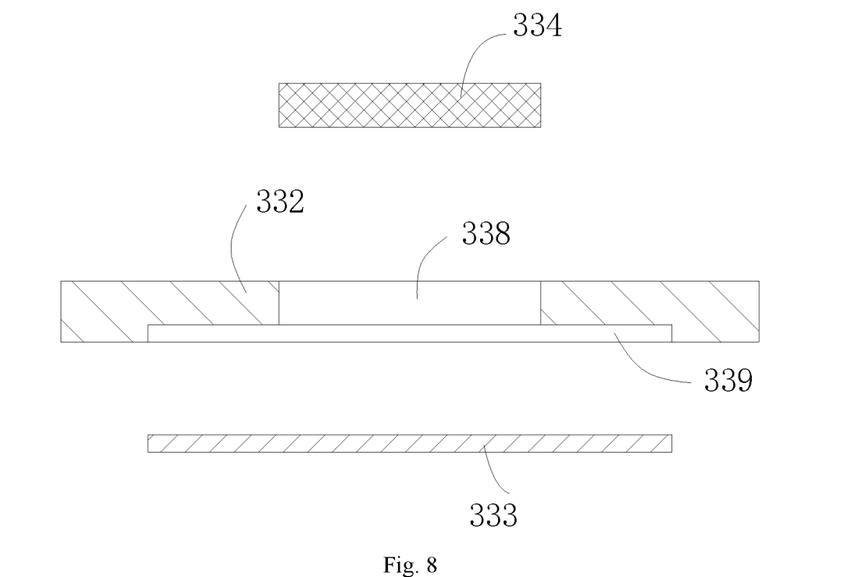
FIG. 8 is a schematic diagram of an exploded structure of a cover assembly in one embodiment of the application.
Figure 9:
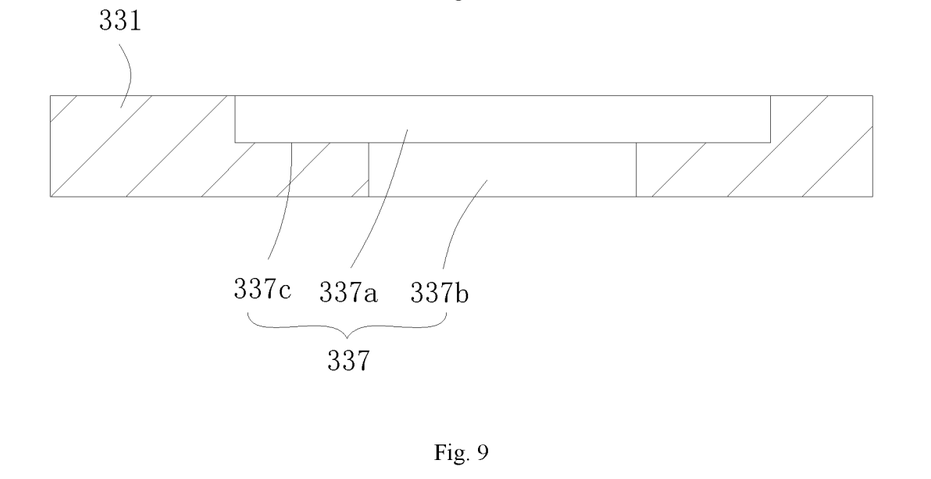
FIG. 9 is a schematic diagram of a partial structure of a cover plate in one embodiment of the application.

With reference to FIGS. 7-9, in some embodiments, the cover plate 331 of the cover assembly 33 provided in the embodiments described above in the application is provided with a first through hole 337 that is in communication with spaces on both sides of the cover plate 331.

In one embodiment, the first through hole 337 penetrates the cover plate 331 in a thickness direction of the cover plate 331, that is, an axis of the first through hole 337 is parallel to the thickness direction of the cover plate 331.

In some embodiments, the fixing member 332 is connected to the cover plate 331. In some embodiments, the fixing member 332 is fixedly connected to the cover plate 331 by welding.

In some embodiments, the second through hole 338 of the fixing member 332 penetrates the fixing member 332 in the thickness direction of the cover plate 331, that is, an axis of the second through hole 338 may also be parallel to the thickness direction of the cover plate 331. The gas in the first through hole 337 may freely flow into the second through hole 338, and certainly, the gas in the second through hole 338 may also freely flow into the first through hole 337.

In some optional embodiments, the fixing member 332 is a metal ring with a second through hole 338, which is simple in structure and conducive to connection to the cover plate 331 and mounting of the breathable film 333.

In some optional embodiments, the breathable film 333 is made of a polymeric material (for example, one or a combination of two or more of polypropylene (PP), polyethylene (PE) and polyurethane (PU)) with breathable properties, and may block liquids. The breathable film 333 and the fixing member 332 are integrally connected to block the first through hole 337, so the breathable film 333 and the fixing member 332 may block the electrolyte solution and prevent the electrolyte solution from leaking.

In some embodiments, the breathable film 333 and the fixing member 332 are connected by means of a chemical bond (ionic bond or covalent bond). Specifically, the breathable film 333 and the fixing member 332 are subjected to surface treatment, so as to form functional groups on a surface of the breathable film 333 and a surface of the fixing member 332, then the breathable film 333 and the fixing member 332 are connected by thermal compounding, and the functional group of the breathable film 333 and the functional group of the fixing member 332 are connected by means of a chemical bond at a bonding surface of the breathable film 333 and the fixing member 332.

The breathable film 333 is connected to the fixing member 332 by means of the chemical bond directly, so a connection strength of the breathable film 333 and the fixing member 332 may be effectively improved, the risk that the breathable film 333 is separated from the fixing member 332 under gas impact may be reduced, and the sealing performance of the battery cell 30 may be improved.

In some embodiments, at least part of the breathable film 333 is sandwiched between the fixing member 332 and the cover plate 331. The fixing member 332 and the cover plate 331 may grip the breathable film 333, thereby further reducing the risk of falling of the breathable film 333.

In some embodiments, with reference to FIG. 9, the first through hole 337 includes an accommodation section 337a and an extension section 337b extending from the accommodation section 337a, a diameter of the accommodation section 337a being greater than that of the extension section 337b. The accommodation section 337a and the extension section 337b are coaxial holes. The extension section 337b is positioned on one side, close to the electrode assembly 32, of the accommodation section 337a. The fixing member 332 is at least partially accommodated in the accommodation section 337a so as to reduce the space occupied by the fixing member 332 and reduce the overall height of the battery cell 30.

The accommodation section 337a is provided with a bottom wall 337c surrounding the extension section 337b, and the fixing member 332 is positioned on one side of the bottom wall 337c. The accommodation section 337a and the extension section 337b with different diameter s form a step surface (that is, the bottom wall 337c), and the step surface may support the fixing member 332, so the fixing member 332 may be conveniently positioned when the fixing member 332 and the cover plate 331 are welded. The accommodation section 337a is further provided with a side wall surrounding the fixing member 332, and the bottom wall 337c and the side wall define the accommodation section 337a.

The breathable film 333 is at least partially sandwiched between the fixing member 332 and the bottom wall 337c to separate the second through hole 338 from the extension section 337b, and the support 334 is arranged on one side, away from the extension section 337b, of the breathable film 333. The breathable film 333 is entirely positioned outside the extension section 337b, and an annular edge portion of its periphery is sandwiched between the fixing member 332 and the bottom wall 337c, so as to improve the sealing performance and prevent the electrolyte solution from flowing out between the bottom wall 337c and the breathable film 333, and the edge portion is compressed.

In some embodiments, the fixing member 332 is provided with a groove 339 arranged around the second through hole 338, and the breathable film 333 is at least partially accommodated in the groove 339. By arranging the groove 339, the space occupied by the breathable film 333 may be reduced, and the overall thickness of the fixing member 332 and the breathable film 333 may be reduced. A thickness of the breathable film 333 may be slightly greater than a depth of the groove 339. When the fixing member 332 and the cover plate 331 are assembled, the fixing member 332 is attached to the bottom wall 337c, and the breathable film 333 is compressed, thereby improving the sealing performance.

In some embodiments, the fixing member 332 is welded to the cover plate 331. Specifically, an interface of the side wall and an outer edge of the fixing member 332 is welded.

As an optional embodiment, according to the cover assembly 33 provided in the embodiment of the application, the support 334 includes a hydrophobic breathable material, the support 334 is made of the hydrophobic breathable material, on the basis of meeting a support requirement for the breathable film 333, it may be improved that gas passing through the breathable film 333 may smoothly pass through the support 334, so as to improve the breathable effect of the breathable film 333, water vapor, etc. may be blocked, so as to avoided the situation that the water vapor enters the battery cell 30 to affect the battery cell 30, and in addition, the electrolyte in the battery cell 30 may be prevented from being exposed.

In some embodiments, the second through hole 338 is filled with the support 334, the support 334 and the fixing member 332 are connected by means of a chemical bond (ionic bond or covalent bond). Illustratively, the support 334 and the fixing member 332 are subjected to surface treatment so as to form functional groups on a surface of the support 334 and a surface of the fixing member 332, then the support 334 and the fixing member 332 are connected by thermal compounding, and the functional group of the support 334 and the functional group of the fixing member 332 are connected by means of a chemical bond at a bonding surface of the support 334 and the fixing member 332. Of course, in some embodiments, the support 334 and the fixing member 332 may be connected by means of a metal bond, a mechanical interference fit, an adhesive fit, etc., as long as the connection strength of the support 334 and the fixing member 332 is met.

Figure 10:
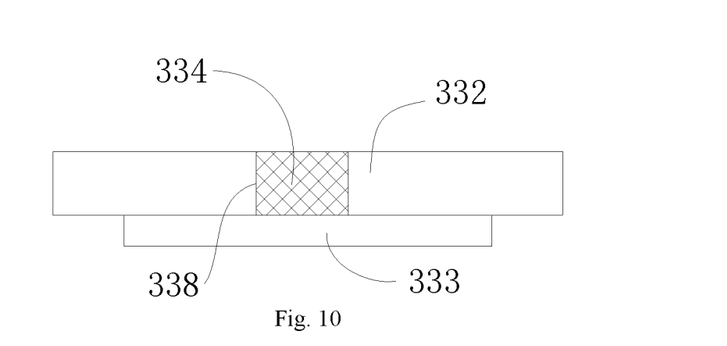
FIG. 10 is a schematic diagram of a partial structure of a cover assembly in another embodiment of the application.

As shown in FIG. 10, as an optional embodiment, the diameter of the second through hole 338 may remain unchanged in a direction away from the breathable film 333, facilitating formation of the second through hole 338 and arrangement of the support 334 so as to improve the support requirements for the breathable film 333.

Figure 11:
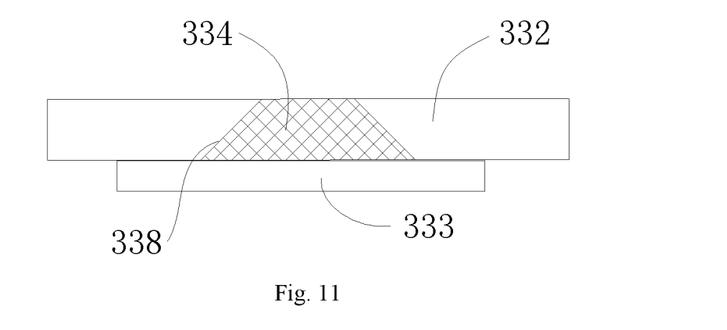
FIG. 11 is a schematic diagram of a partial structure of a cover assembly in yet another embodiment of the application.
Figure 12:
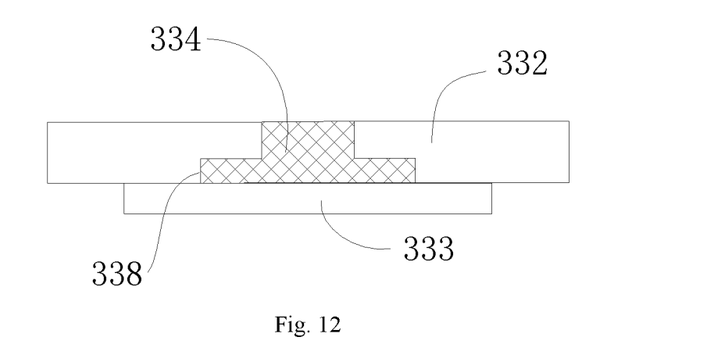
FIG. 12 is a schematic diagram of a partial structure of a cover assembly in yet another embodiment of the application.
Figure 13:
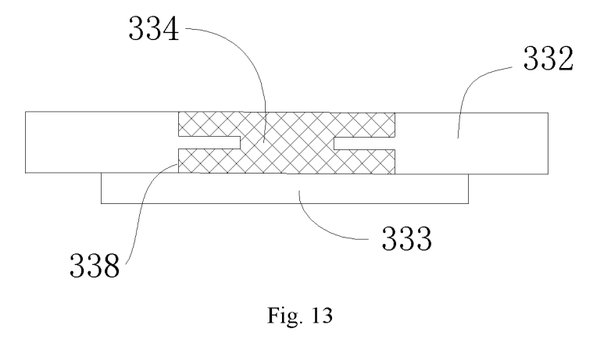
FIG. 13 is a schematic diagram of a partial structure of a cover assembly in yet another embodiment of the application.

With reference to FIGS. 11-13, in some embodiments, a diameter of at least part, in a length direction, of the second through hole 338 tends to be reduced in a direction away from the breathable film 333. When the cover assembly 33 is used for the battery cell 30, one side of the breathable film 333 faces a battery assembly and makes direct contact with the gas inside the battery cell 30. The diameter of at least part, in the length direction, of the second through hole 338 tends to be reduced in the direction away from the breathable film 333, so when the breathable film 333 deforms outwards in advance under the action of the internal gas pressure of the battery cell 30, a hole wall of the second through hole 338 formed in an enclosing mode may provide certain support for the breathable film 333 at a diameter reducing position, so as to reduce or avoid deformation of the breathable film 333, thereby improving the breathable effect and the safety performance of the breathable film 333.

Illustratively, with reference to FIG. 11, the diameter of the second through hole 338 may be gradually reduced in a direction away from the breathable film 333, the second through hole 338 may be a tapered hole, the second through hole 338 is filled with the support 334, and the support 334 is connected to the fixing member 332.

In some examples, with reference to FIG. 12, the diameter of the second through hole 338 may be reduced section by section in a direction away from the breathable film 333, the second through hole 338 may be a stepped hole, the second through hole 338 is filled with the support 334, and the support 334 is connected to the fixing member 332.

Certainly, in some other examples, as shown in FIG. 13, the diameter of the second through holes 338 may also be firstly reduced and then increased in a direction away from the breathable film 333, which likewise meets the breathable effect and safety performance requirements of the breathable film 333.

In some optional embodiments, a melting point of the support 334 is greater than that of the breathable film 333. When a temperature of the battery cell 30 reaches the melting point of the breathable film 333, the breathable film 333 deforms and flows, since the melting point of the support 334 is greater than that of the breathable film 333, a material of the support 334 does not reach the melting point thereof, a support framework effect may be achieved on the breathable film 333, and flowing and deformation of the breathable film 333 may be reduced.

As an optional embodiment, according to the cover assembly 33 provided in the embodiment of the application, a difference value between the melting point of the support 334 and the melting point of the breathable film 333 is greater than or equal to 10° C. By means of the above arrangement, the support 334 may be effectively prevented from deforming when the breathable film 333 deforms and flows, thereby improving a support effect on the breathable film 333.

In some optional embodiments, a shear strength at a joint between the support 334 and the fixing member 332 is greater than or equal to 0.3 MPa. By means of the above arrangement, when internal pressure of the battery cell 30 is increased, shape stability of the support 334 and stability of connection strength between the support 334 and the fixing member 332 may be improved, thereby improving the support effect on the breathable film 333, preventing the breathable film 333 from deforming or even breaking, and improving the breathable effect of the breathable film 333.

As one optional embodiment, according to the cover assembly 33 provided in the embodiment of the application, the breathability of the support 334 is greater than that of the breathable film 333. Since the breathable film 333 is made of a material for controlling the entire breathable effect of the battery, gas passing through the breathable film 333 needs to be smoothly discharged from the support 334 to the outside of the battery cell 30. The breathability of the support 334 is greater than that of the breathable film 333, so the gas, passing through the breathable film 333, in the battery cell 30 may be smoothly discharged from the support 334, so as to improve the safety performance of the battery cell 30.

In some optional embodiments, a difference value between a maximum size of the breathable film 333 and a maximum size of the support 334 is greater than or equal to 8 mm in a radial direction of the first through hole 337, and an orthographic projection of a geometric center of the breathable film 333 coincides with an orthographic projection of a geometric center of the support 334 in an axial direction of the first through hole 337. By means of the above arrangement, a combination area between a periphery of the breathable film 333 and the support 334 may be improved, and composite strength and sealing performance between the breathable film 333 and the support 334 may be improved.

Figure 14:
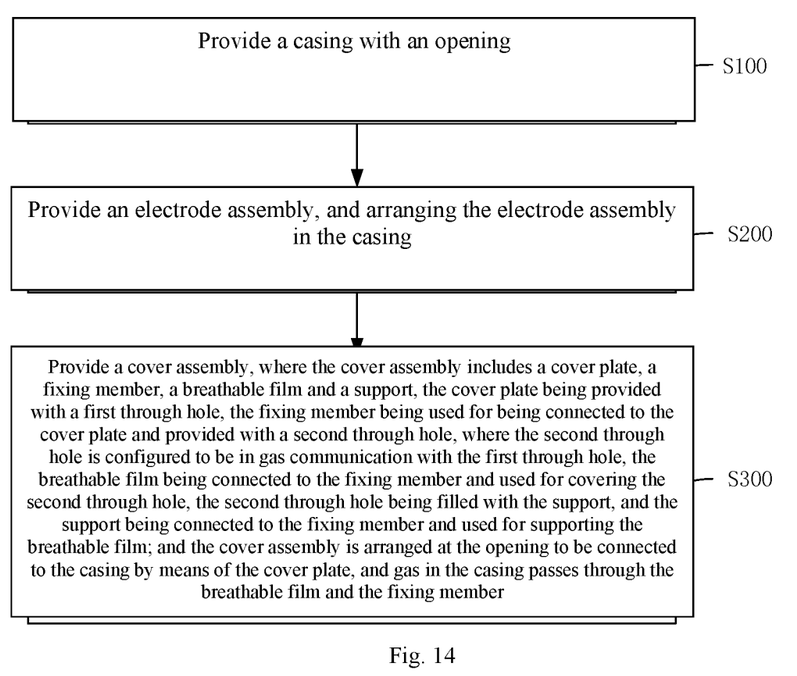
FIG. 14 is a schematic flowchart of a method for manufacturing a battery cell in one embodiment of the application.

As shown in FIG. 14, in another aspect, the embodiment of the application further provides a method for manufacturing a battery cell 30. The method may be used to prepare the battery cell of the embodiment shown in FIGS. 4-13, and includes:

S100, provide a casing 31 provided with an opening;

S200, provide an electrode assembly 32, and arranging the electrode assembly 32 in the casing 31; and S300, provide a cover assembly 33, where the cover assembly 33 includes a cover plate 331, a fixing member 332, a breathable film 333 and a support 334, the cover plate 331 being provided with a first through hole 337, the fixing member 332 being used for being connected to the cover plate 331 and provided with a second through hole 338, where the second through hole 338 is configured to be in gas communication with the first through hole 337, the breathable film 333 being connected to the fixing member 332 and used for covering the second through hole 338, the second through hole 338 being filled with the support 334, and the support 334 being connected to the fixing member 332 and used for supporting the breathable film 333; and the cover assembly 33 is arranged at the opening of the casing 31 to be connected to the casing 31 by means of the cover plate 331, and gas in the casing 31 passes through the breathable film 333 and the fixing member 332.

According to the battery cell 30 prepared by means of the method for manufacturing the battery cell 30 provided in the embodiment of the application, gas generated in the battery cell may be discharged to the outside of the battery cell 30 by means of the breathable film 333, and the gas is prevented from being accumulated in the casing 31, thereby improving performance of the electrode assembly 32 and prolonging the service life of the battery cell 30. By arranging the support 334, the breathable film 333 may be supported, it may be improved that the breathable film 333 is still kept intact under the condition of large internal pressure of the battery cell 30, damage to the breathable film 333 may be avoided, breathable performance of the breathable film 333 in the entire service life of the battery cell 30 may be improved, and further the safety performance of the battery cell 30 may be improved.

Figure 15:
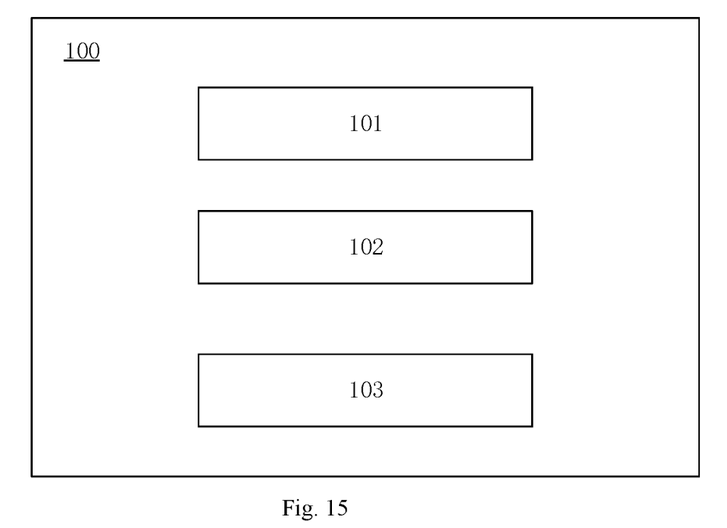
FIG. 15 is a structural schematic diagram of an apparatus for manufacturing a battery cell in one embodiment of the application.

As shown in FIG. 15, in yet another aspect, the embodiment of the application further provides an apparatus 100 for manufacturing a battery cell 30. The apparatus 100 may be used for manufacturing the battery cell of the embodiment shown in FIGS. 4-13 and includes a first assembling device 101, a second assembling device 102 and a third assembling device 103. The first assembling device 101 is configured to provide a casing 31 provided with an opening. The second assembling device 102 is configured to provide an electrode assembly 32, where the electrode assembly 32 is arranged in the casing 31. The third assembling device 103 is configured to provide a cover assembly 33, where the cover assembly 33 includes a cover plate 331, a fixing member 332, a breathable film 333 and a support 334, the cover plate 331 being provided with a first through hole 337, the fixing member 332 being used for being connected to the cover plate 331 and provided with a second through hole 338, where the second through hole 338 is configured to be in gas communication with the first through hole 337, the breathable film 333 being connected to the fixing member 332 and used for covering the second through hole 338, the second through hole 338 being filled with the support 334, and the support 334 being connected to the fixing member 332 and used for supporting the breathable film 333, and the cover assembly 33 is arranged at the opening to be connected to the casing 31 by means of the cover plate 331, and gas in the casing 31 passes through the breathable film 333 and the fixing member 332.

The apparatus for manufacturing the battery cell 30 provided in the embodiment of the application may be used for manufacturing the battery cell 30 provided in the above embodiments, gas generated in the battery cell 30 manufactured by means of the apparatus may be discharged to the outside of the battery cell 30 by means of the breathable film 333, and the gas is prevented from being accumulated in the casing 31, thereby improving performance of the electrode assembly 32 and prolonging the service life of the battery cell 30. By arranging the support 334, the breathable film 333 may be supported, it may be improved that the breathable film 333 is still kept intact under the condition of large internal pressure of the battery cell 30, damage to the breathable film 333 may be avoided, breathable performance of the breathable film 333 in the entire service life of the battery cell 30 may be improved, and further the safety performance of the battery cell 30 may be improved.

While the application has been described with reference to optimal embodiments, various modifications may be made thereto and equivalents may be substituted for components thereof without departing from the scope of the application. In particular, the various technical features mentioned in the various embodiments may be combined in any way as long as no structural conflict exists. The application is not limited to the particular embodiments disclosed herein, but includes all technical solutions falling within the scope of the claims.

What is claimed is:

1. A cover assembly of a battery cell, comprising:
   a cover plate provided with a first through hole,
   a breathable film disposed on a top of the first through hole to cover the first through hole, a size of the breathable film being greater than a cross-sectional size of the first through hole,
   a support disposed on a top surface of the breathable film and configured to support the breathable film, a size of the support being smaller than the size of the breathable film, a cross section of the support along a vertical direction is a trapezoid, and
   a fixing member being connected to the cover plate and being disposed on the top surface and side surfaces of the breathable film and on side surfaces of the support, a bottom surface of the fixing member being coplanar with a bottom surface of the breathable film, a top surface of the fixing member being coplanar with a top surface of the support, and the breathable film and the support being configured to be in gas communication with the first through hole.

2. The cover assembly according to claim 1, wherein a difference value between the melting point of the support and the melting point of the breathable film is greater than or equal to 10° C.

3. The cover assembly according to claim 2, wherein a shear strength at a joint between the support and the fixing member is greater than or equal to 0.3 MPa.

4. The cover assembly according to claim 3, wherein the breathability of the support is greater than that of the breathable film.

5. The cover assembly according to claim 4, wherein the fixing member is a metal ring provided with a second through hole, the support comprises a hydrophobic breathable material, and the support is connected to the fixing member by means of a chemical bond or a metal bond.

6. The cover assembly according to claim 5, wherein a difference value between a maximum size of the breathable film and a maximum size of the support is greater than or equal to 8 mm in a radial direction of the first through hole, and an orthographic projection of a geometric center of the breathable film coincides with an orthographic projection of a geometric center of the support in an axial direction of the first through hole.

7. The cover assembly according to claim 6, wherein a diameter of the second through hole remains unchanged in a direction away from the breathable film.

8. The cover assembly according to claim 6, wherein a diameter of at least part, in a length direction, of the second through hole tends to be reduced in a direction away from the breathable film.

9. The cover assembly according to claim 8, wherein the diameter of the second through hole is gradually reduced in the direction away from the breathable film;
or the diameter of the second through hole is reduced section by section in the direction away from the breathable film;
or the diameter of the second through hole is firstly reduced and then increased in the direction away from the breathable film.

10. The cover assembly according to claim 9, wherein the first through hole comprises an accommodation section and an extension section extending from the accommodation section, a diameter of the accommodation section being greater than that of the extension section, and the fixing member and the support are at least partially accommodated in the accommodation section.

11. The cover assembly according to claim 10, wherein the accommodation section is provided with a bottom wall surrounding the extension section, the breathable film is at least partially sandwiched between the fixing member and the bottom wall to separate the second through hole from the extension section, and the support is arranged on one side, away from the extension section, of the breathable film.

12. The cover assembly according to claim 11, wherein the fixing member is provided with a groove arranged around the second through hole, and the breathable film is at least partially accommodated in the groove.

13. A battery cell, comprising:
a casing provided with an opening;
an electrode assembly accommodated in the casing; and
the cover assembly according to claim 1, wherein the cover assembly is connected to the casing and covers the opening of the casing, and the breathable film is positioned between the electrode assembly and the support.

14. A battery, comprising the battery cell according to claim 13.

15. An electric device, comprising the battery according to claim 14, wherein the battery is used for providing electrical energy.

* * * * *